United States Patent [19]

Zepernick et al.

[11] Patent Number: 4,889,153

[45] Date of Patent: Dec. 26, 1989

[54] COMBO FLUID VALVE

[75] Inventors: Dean E. Zepernick; Donald R. Olson; Robert D. Scott, all of Columbiana County, Ohio

[73] Assignee: Hunt Valve Company, Salem, Ohio

[21] Appl. No.: 17,750

[22] Filed: Feb. 24, 1987

[51] Int. Cl.⁴ .......................................... F16K 11/065
[52] U.S. Cl. ................................ 137/269; 137/625.65; 137/625.69
[58] Field of Search ...................... 137/625.69, 625.65, 137/269

[56] References Cited

U.S. PATENT DOCUMENTS

| | | | |
|---|---|---|---|
| 2,799,203 | 3/1974 | Doutt | 137/625.65 |
| 3,556,155 | 1/1971 | Morris | 137/625.69 |
| 3,588,037 | 6/1971 | Ritchie | 137/625.69 X |
| 3,786,831 | 1/1974 | Clippard | 137/269 |
| 4,096,880 | 6/1978 | Lemon et al. | |
| 4,182,375 | 1/1980 | Fukano | 137/625.69 |
| 4,220,174 | 2/1980 | Spitz | |
| 4,418,711 | 12/1983 | Stoll | 137/625.69 X |

Primary Examiner—Alan Cohan
Attorney, Agent, or Firm—Frederic E. Naragon

[57] ABSTRACT

A valve construction which may be used to control the flow of any desired fluid in any desired valving action and which provides an interchangeable and removable activating means and an interchangeable and removable valve cartridge assembly of the lap spool, packed spool, proportional flow or any other version. The valve comprises a removable and interchangeable activating means, a removable and interchangeable cap assembly, a novel housing adapted to accept a removable and interchangeable valve cartridge assembly of the lap spool, packed spool, proportional flow, or any other version, and a removable and interchangeable valve cartridge assembly of the lap spool, packed spool, proportional flow, or any other version comprised of a plunger and separator means.

8 Claims, 4 Drawing Sheets

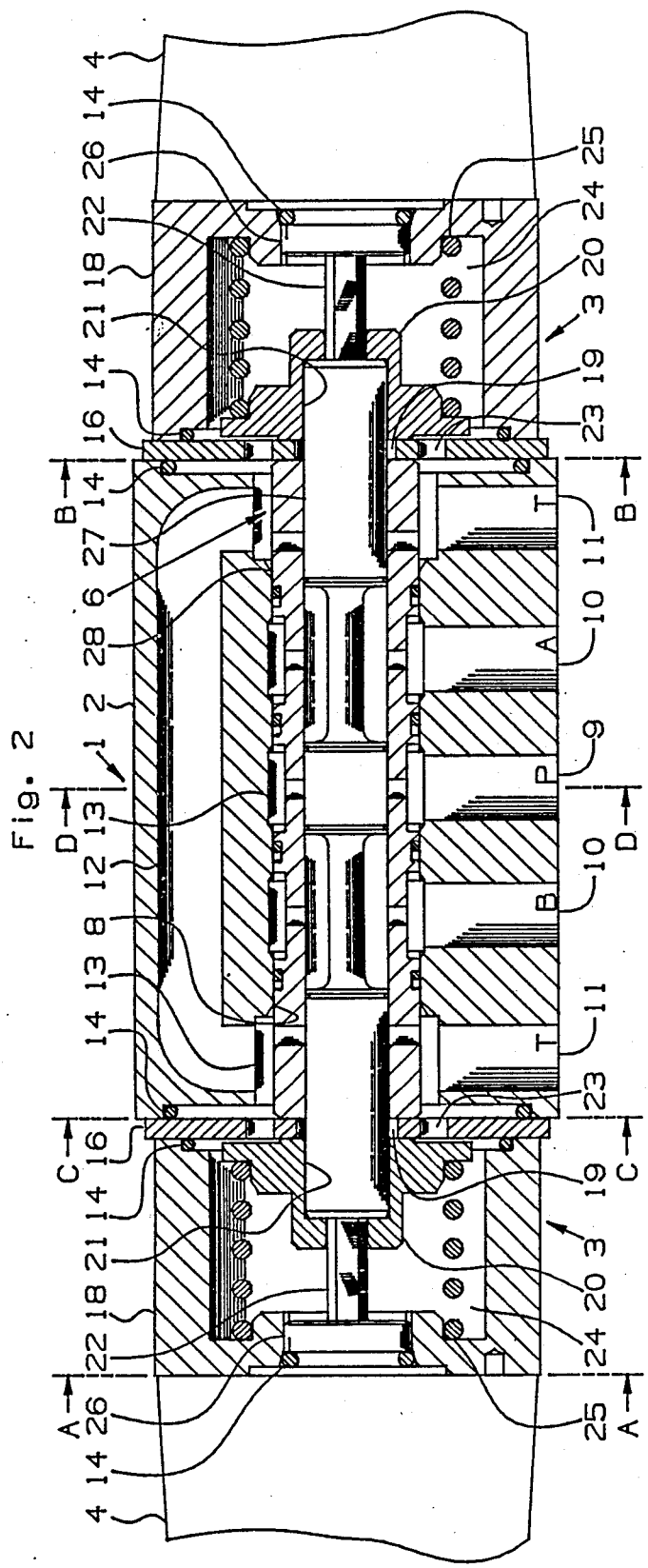
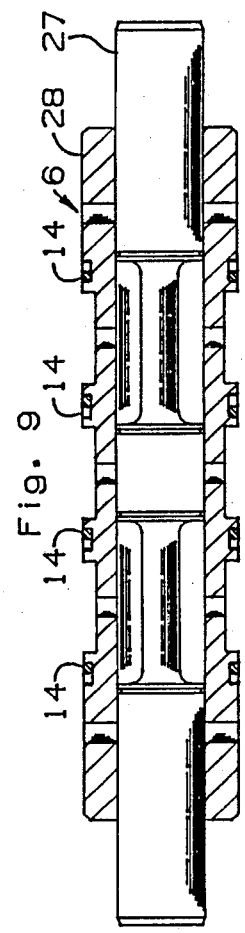
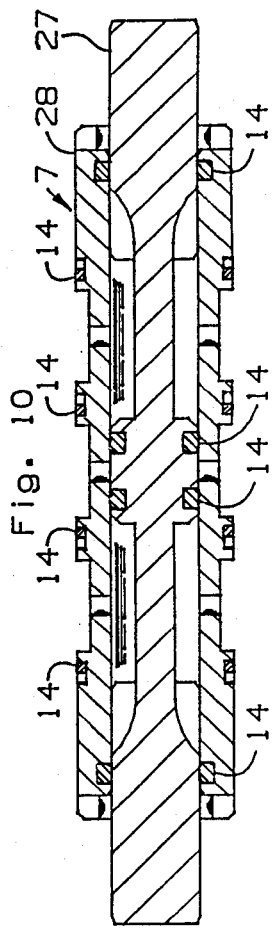

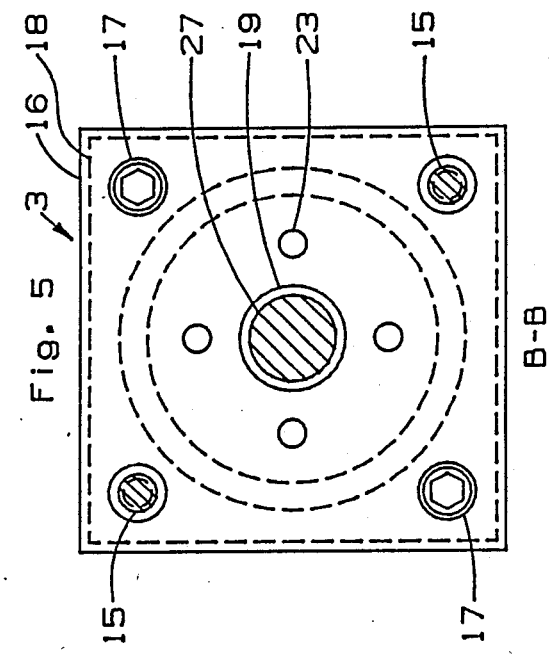
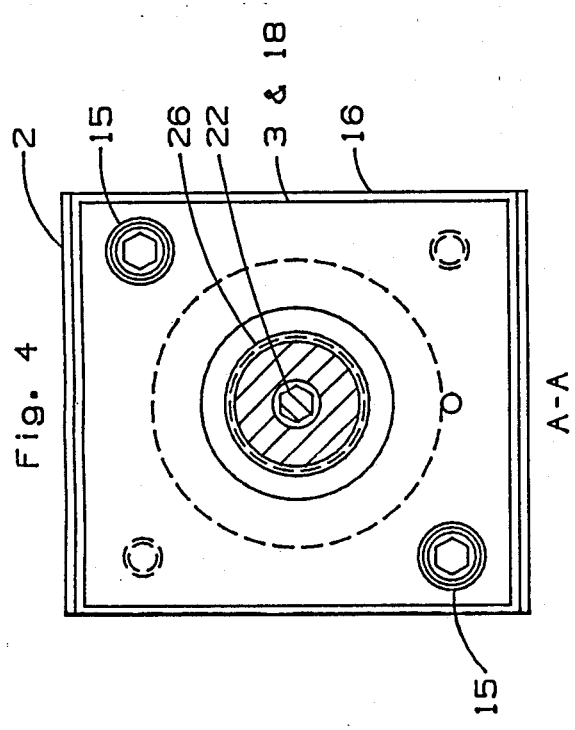
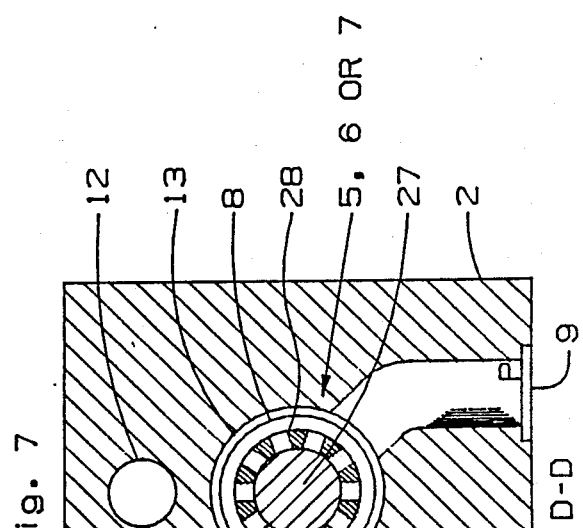
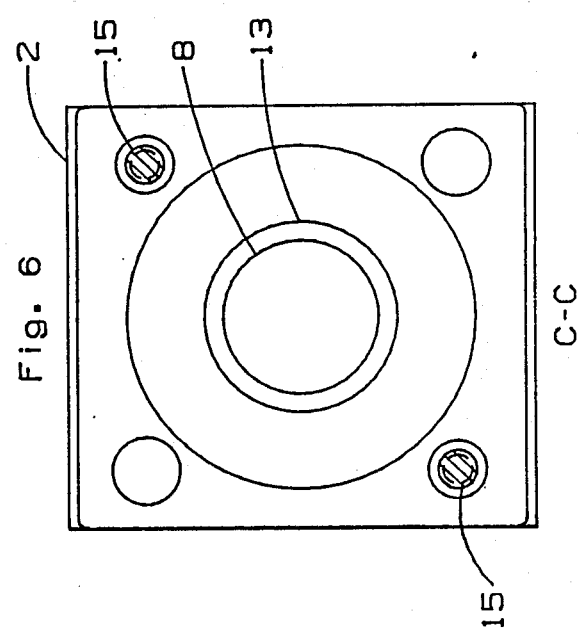

COMBO FLUID VALVE

BACKGROUND OF THE INVENTION

This invention pertains to a Combo Fluid Valve (Combination Fluid Valve). The prior art discloses patents for valves of the packed spool, lap spool, or proportional flow version and valves which employ cartridge units which may be assembled outside of the valve body and moved into the bore in the body of the unit. Some of the patents as listed are as follows:

U.S. Pat. No. 4,096,880 - Lemon, et al., June 27, 1978
U.S. Pat. No. 4,220,174 - Spitz - Sept. 2, 1980
U.S. Pat. No. Des. 253,716 - Spitz - Dec. 18, 1979

However, such prior art construction does not disclose an activating means which may be removed and interchanged with various activating means such as solenoids, levers, pedals and other means without the necessity of removing or changing the valving means or housing. In addition the prior art does not disclose a removable and interchangeable cap assembly which provides for removal and interchangings of valve cartridge assemblies without the necessity of changing or removing the entire housing. Further the prior art does not disclose a valve housing which is adapted to accept valve cartridge assemblies of any version such as lap spool, packed spool, proportional flow, and others.

The present invention discloses both a removable and interchangeable activating means and a removable and interchangeable cap assembly which allows for removal and changing of valve cartridge assemblies and activating means at the site of the valve without the necessity of removing and changing the entire valve housing. Labor costs and assembly operations are thus reduced and maintenance of the valve is minimized.

Further, the present invention discloses over the prior art a novel housing with a plurality of ports of any desired configuration which is adapted to accept interchangeable and removable valve cartridge assemblies of the lap spool, packed spool, proportional flow, or other versions at the site of the valve. Thus, any valving operation can be accomplished by the same valve and any fluid, particularly all hydraulic fluids considered in the normal range of industrial hydraulics, can be accepted by the same valve without the necessity of removing, replacing, or changing the entire valve.

A removable and interchangeable valve cartridge assembly is also disclosed by the present invention over the prior art comprising a seperator means and valve plunger which may be removed and changed at the site of the valve without the necessity of removing the entire valve. Any desired valve cartridge assembly of the lap spool, packed spool, proportional flow or other version may be inserted, removed, replaced or interchanged into the valve housing on site. By reason thereof the present invention provides a universal and combination valve which may perform any desired valving operation and which can accept any desired fluid.

The valve herein described is ideally suited to activation by electric solenoid and in addition provides for the use of the fluid media being operated on by the valve to cool the electric solenoid during the valving action.

SUMMARY OF THE INVENTION

The present invention relates to a Combo Fluid Valve (Combination Fluid Valve) which overcomes the foregoing and other drawbacks and provides a novel and improved valve.

In accordance with the present invention a combination valve is provided with a novel housing with a plurality of ports of any desired configuratin which is adapted to accept interchangeable and removable valve cartridge assemblies comprising a plunger and seperator means of the lap spool, packed spool, proportional flow, or other versions. Any of the foregoing valve versions may be removed and interchanged with the novel housing at the site of the valve and any valving operation can be accomplished by the same valve and can accept any fluid. Other objects and a fuller understanding of the invention can be had by referring to the following description and claims taken in conjunction with the accompanying drawings.

BRIEF DESCRIPTION OF THE DRAWINGS

FIG. 2 is a longitudinal cross-sectional view of the present invention with lap spool cartridge assembly.

FIG. 4 is an end cross-sectional view of the removable and interchangeable cap assembly through line A—A of FIG. 1, FIG. 2, and FIG. 3.

FIG. 5 is an end cross-sectional view of the removable and interchangeable cap assembly through line B—B of FIG. 2 and FIG. 3.

FIG. 6 is an end cross-sectional view of the valve housing through line C—C of FIG. 1, FIG. 2, and FIG. 3 with removable and interchangeable valve cartridge assembly removed.

FIG. 7 is an end cross-sectional view of the valve housing through line D—D of FIG. 1 and FIG. 2 with removable and interchangeable valve cartridge assembly disposed within.

FIG. 9 is a longitudinal cross-sectional view of removable and interchangeable lap spool cartridge assembly.

FIG. 10 is a longitudinal cross-sectional view of removable and interchangeable packed spool cartridge assembly.

DETAILED DESCRIPTION OF THE DRAWINGS

Figure 1:
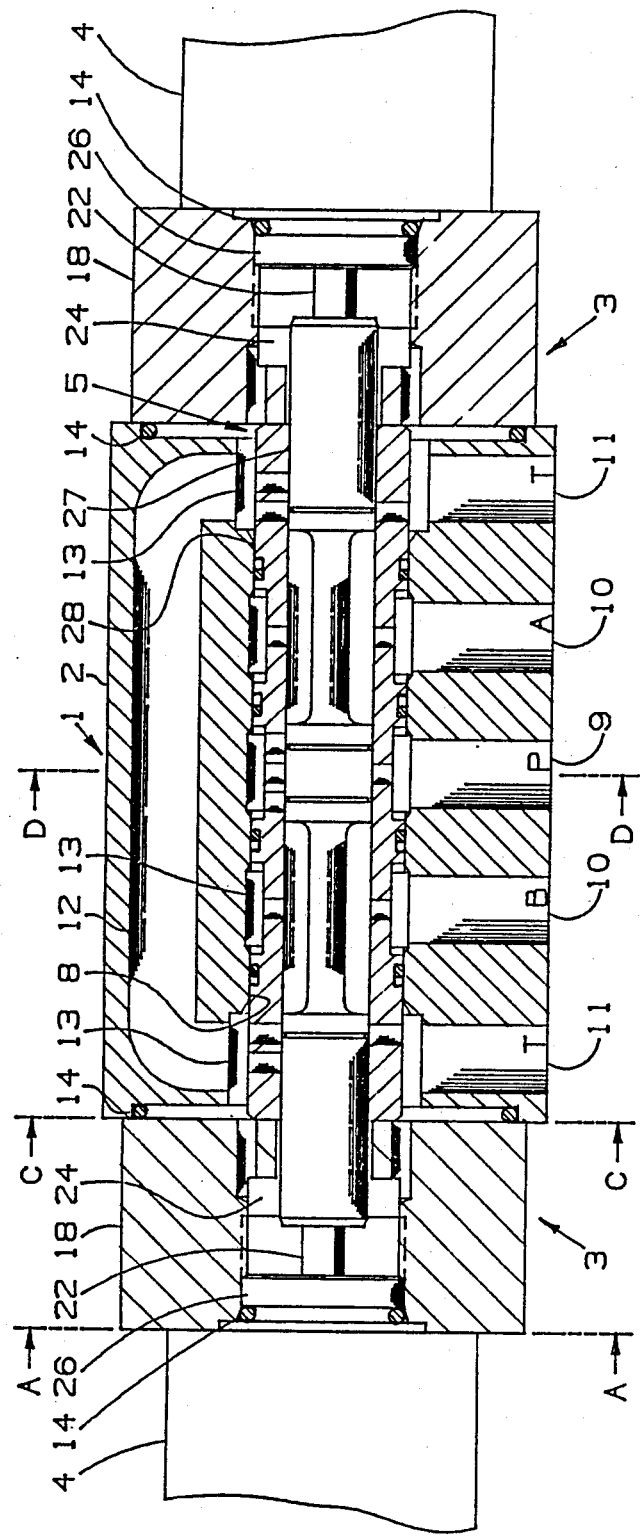
FIG. 1 is a longitudinal cross-sectional view of the present invention with proportional flow valve cartridge assembly.

Reference is now made to the drawings wherein the present invention is illustrated in detail and wherein similar components bear the same reference numeral throughout the several views.

Figure Number 1 illustrates a longitudinal cross-sectional view of one form of the entire invention generally referred to by Numeral 1. A removable and interchangeable proportional flow valve cartridge assembly 5, comprising a plunger 27, and seperator means 28, disposed within the bore 8 of valve housing 2. A removable and interchangeable cap assembly 3 is disposed at both ends of the valve housing 2 and comprises a cap 18, connecting means 22, cap chamber 24, and fastening means 26. A removable activating means 4 is disposed at each end of the removable and interchangeable cap assembly 3. Sealing means 14 are disposed within the valve housing 2 and removable and interchangeable cap assembly 3. Pressure inlet port 9, a plurality of cylinder ports 10, a plurality of tank flow ports 11, a tank port connecting means 12, and bore reliefs 13 are disposed within the valve housing 2 for operation of the valve.

FIG. 2 illustrates a longitudinal cross-sectional view of one form of the entire invention generally referred to by Numeral 1. A removable and interchangeable lap spool cartridge assembly 6, comprising a plunger 27 and seperator means 28, is disposed within the bore 8 of valve housing 2. A removable and interchangeable cap assembly 3 is disposed at both ends of the valve housing 2 and comprises a cap 18, connecting means 22, adapter bores 21 to accept plunger 27, cap chamber 24, biasing means 25, adapter 20, end plate 16, and plate bore 19, end plate ports 23, and fastening means 26. A removable and interchangeable activating means 4 is disposed at each end of the removable and interchangeable cap assembly 3. Sealing means 14 are disposed within the valve housing 2 and removable and interchangeable cap assembly 3. Pressure inlet port 9, a plurality of cylinder ports 10, a plurality of tank flow ports 11, a tank port connecting means 12, and bore reliefs 13 are disposed within the valve housing 2 for operation of the valve.

Figure 3:
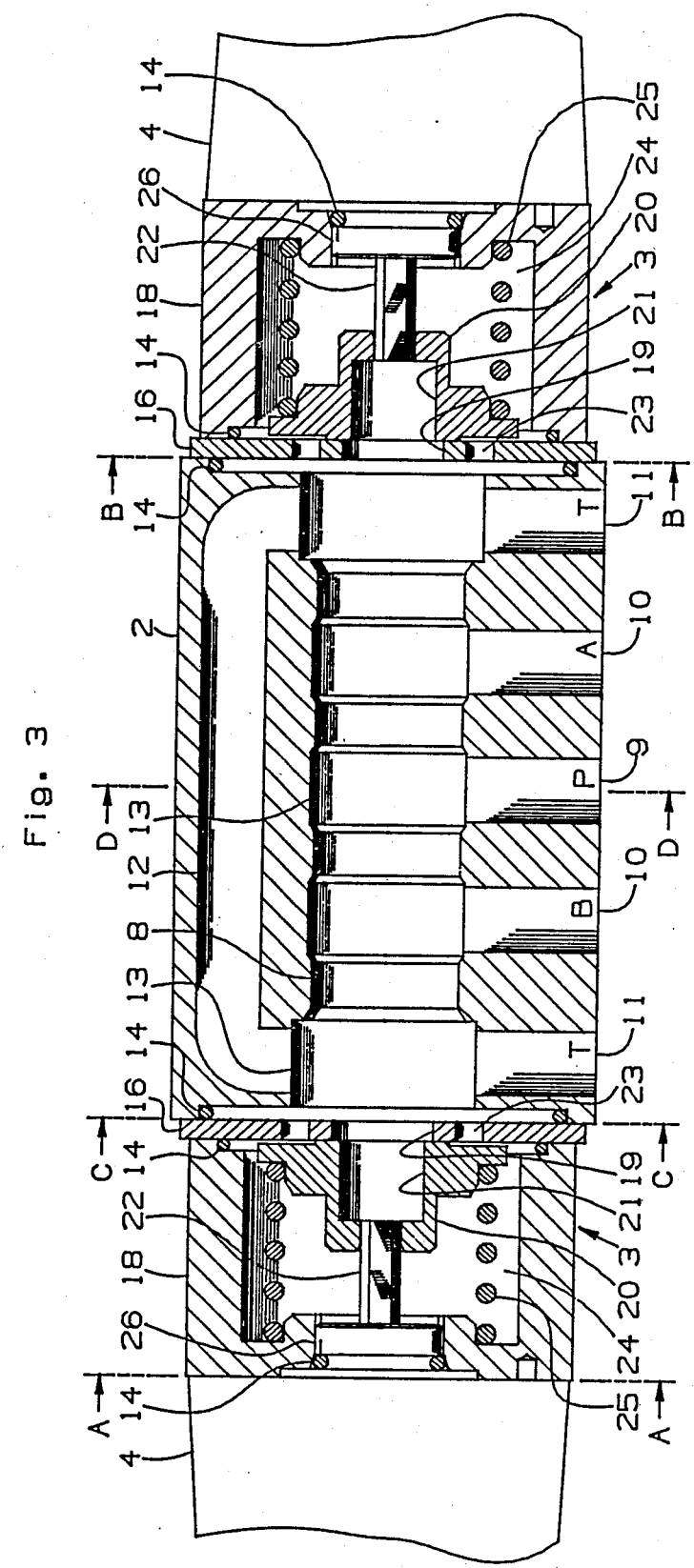
FIG. 3 is a longitudinal cross-sectional view of the present invention with the valve cartridge assembly removed.

FIG. 3 is a longitudinal cross-sectional view of one form of the invention with the removable and interchangeable valve cartridge assembly 5, 6, or 7 removed from the bore 8 of the valve housing 2. A removable and interchangeable cap assembly 3 is disposed at both ends of the valve housing 2 and comprises a cap 18, connecting means 22, adapter bore 21 to accept plunger 27, cap chamber 24, biasing means 25, adapter 20, end plate 16, end plate bore 19, end plate ports 23, and fastening means 26. A removable and interchangeable activating means 4 is disposed at each end of the removable and interchangeable cap assembly 3. Sealing means 14 are disposed within the valve housing 2 and removable and interchangeable cap assembly 3. Pressure inlet port 9, a plurality of cylinder ports 10, a plurality of tank flow ports 11, a tank port connecting means 12, and bore reliefs 13 are disposed within the valve housing 2 for operation of the valve.

FIG. 4 is an end cross-sectional view of the removable and interchangeable cap assembly 3 through line A—A of FIG. 1, FIG. 2, and FIG. 3. FIG. 4 illustrates an end view of the valve housing 2, cap 18, end plate 16, fastening means 15 for the cap 18 to the valve housing 2, connecting means 22, and fastening means 26 for fastening the cap 18 to the activating means 4.

FIG. 5 is an end cross-sectional view of the removable and interchangeable cap assembly 3 through line B—B of FIG. 2 and FIG. 3. FIG. 5 illustrates an end view of cap 18, end plate 16, fastening means 15 for the cap 18 to the valve housing 2, fastening means 17 for the end plate 16 to the cap 18, plunger 27, end plate bore 19, and end plate ports 23.

FIG. 6 is an end cross-sectional view of the valve housing 2 through line C—C of FIG. 1, FIG. 2, and FIG. 3 with removable and interchangeable valve cartridge assembly 5, 6, or 7 removed. FIG. 6 illustrates an end view of bore 8 in valve housing 2, bore reliefs 13, and fastening means 15 for the cap 18 to the valve housing 2.

FIG. 7 is an end cross-sectional view of the valve housing 2 through line D—D of FIG. 1 and FIG. 2 with removable and interchangeable valve cartridge assembly 5, 6, or 7 disposed within. FIG. 7 illustrates plunger 27, seperator means 28, bore 8 within valve housing 2, pressure inlet port 9, tank port connecting means 12, and bore reliefs 13 disposed within valve housing 2.

Figure 8:
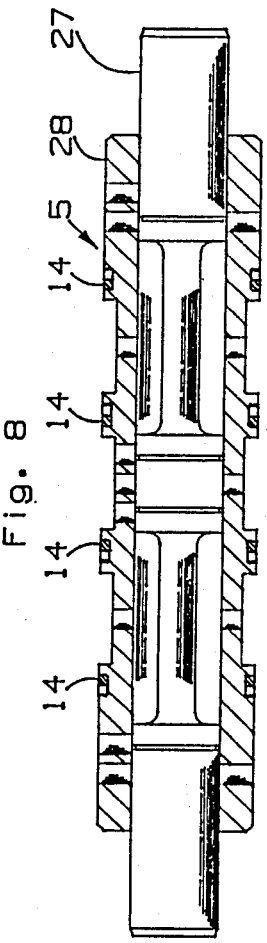
FIG. 8 is a longitudinal cross-sectional view of removable and interchangeable proportional flow cartridge assembly.

FIG. 8 is a longitudinal cross-sectional view of a removable and interchangeable proportional flow cartridge assembly 5 and illustrates plunger 27 disposed within seperator means 28, and sealing means 14.

FIG. 9 is a longitudinal cross-sectional view of a removable and interchangeable packed spool valve cartridge assembly 7 and illustrates plunger 27 disposed within seperator means 28 and sealing means 14.

FIG. 10 is a longitudinal cross-sectional view of a removable and interchangeable packed spool valve cartridge assembly 7 and illustrates plunger 27 disposed within seperator means 28 and sealing means 14.

DESCRIPTION OF THE PREFERRED EMBODIMENT

Referring to FIGS. 1 through 9 the preferred embodiment of the present invention is a fluid control valve (combo valve) generally referred to as Number 1 comprising a valve housing 2. Having a bore 8 adapted to slidably accept a removable and interchangeable packed spool cartridge assembly 7, which assembly 7 comprises a plunger 27 and seperator means 28, and which valve housing 2 has disposed within for operation of the valve a plurality of cylinder ports 10 communicating with the bore 8, a plurality of tank flow ports 11 communicating with the bore 8, a pressure inlet port 9 communicating with the bore 8, a tank port connecting means 12 communicating with the tank ports 11, a plurality of bore reliefs 13 disposed at ports 9, 10, and 11 and communicating therewith, sealing means 14 disposed at both ends of the bore 8, and fastening means 15 for securing the valve housing 2 to a removable and interchangeable cap assembly 3.

The cap assembly 3 of the preferred embodiment of the present invention 1 is disposed at both ends of the valve housing 2 and comprises a cap 18, secured by fastening means 17 to an end plate 16 with an adapter 20 extending axially from the end plate 16 and with a bore 21 disposed within the adapter 20 to slidably accept the removable and interchangeable packed spool valve cartridge assembly 7 and communicating therewith and a cap chamber 24 disposed within the cap 18 to house the adapter 20, and biasing means 25 to bias the adapter 20 against the end plate 16, and connecting means 22 to connect the adapter 20 to activating means 4. Sealing means 14 are disposed with the cap assembly 3.

The activating means 4 of the preferred embodiment of the present invention 1 is a solenoid secured to the connecting means 22 by fastening means 26 at both ends of the cap assembly 3. The activating means 4 are removable and interchangeable.

In operation the activating means 4 are activated at either end to slidably move the plunger 27 of the removable and interchangeable packed spool valve cartridge assembly 7 within the bore 8 of the valve housing 2 and communicating with ports 9, 10, and 11, and tank port connecting means 12 to perform any desired valving operation.

Although the invention has been described in preferred form with a certain degreee of particularity, it is understood that the present disclosure of the preferred form has been made only by way of example and numerous changes in the details of construction and the combination arrangement of parts may be resorted to without departing from the spirit and the scope of the invention as hereinafter claimed.

What is claimed is:

1. A fluid control valve comprising:
   a valve housing adapted to accept a removable and interchangeable valve cartridge assembly of any version;
   a removable and interchangeable cap assembly mechanism disposed at either end of said valve housing and comprising;
   an end plate with fastening means to removable fasten said end plate to a cap having a chamber within, said end plate having a bore within adapted to slidably accept the end of said removable and interchangeable valve cartridge assembly and communicating therewith and communicating with the bore of said valve housing, and a plurality of ports of any desired configuration extending axially from said end plate and communicating with said cap chamber and an adapter disposed within said cap chamber,
   said adapter disposed axially from and biased against said end plate and within said cap chamber having a bore communicating at one end with the bore of said end plate and to slidably accept the end of said removable and interchangeable valve cartridge assembly and commmunicate therewith and a bore at the opposite end adapted to accept a connecting means from a removable and interchangeable activating means and communicating therewith,
   said cap with fastening and sealing means to removably fasten said cap at one end to the said end plate and comprising said cap chamber disposed to accept said adapter, said connecting means, and biasing means to bias said adapter against said end plate within said cap chamber; a bore at the opposite end of said cap with sealing means adapted to slidably accept said connecting means and cooperating with said connecting means and said activating means, and a fastening means disposed at said end of the cap to removably fasten said cap to said activating means;
   said removable and interchangeable activating means disposed at the end of said removable and interchangeable cap assembly mechanism and cooperating therewith to activate said removable and interchangeable valve cartridge assembly of any version; and
   said removable and interchangeable valve cartridge assembly of any version disposed within said valve housing.

2. The fluid control valve of claim 1 wherein the removable and interchangeable valve cartridge assembly is of the lap spool version.

3. The fluid control valve of claim 1 wherein the removable and interchangeable valve cartridge assembly is of the packed spool version.

4. The fluid control valve of claim 1 wherein the removable and interchangeable valve cartridge assembly is of the proportional flow version.

5. A fluid control valve comprising:
   a valve housing adapted to accept a removable and interchangeable valve cartridge assembly, said valve housing having a bore adapted to slidably accept said removable and interchangeable valve cartridge assembly, a plurality of lateral cylinder ports of any desired configuration spaced apart in a directin radially of said bore and communicating therewith, a plurality of tank flow ports of any desired configuration spaced apart in a direction radially of said bore and communicating therewith, a pressure inlet port of any desired configuration communicating with said bore, a tank port connecting means communicating with said tank ports, a plurality of bore reliefs extending radially around said bore at said ports, a sealing means disposed at either end of said bore, and a fastening means disposed at either end of said bore to accept a removable and interchangeable cap assembly mechanism;
   said removable and interchangeable cap assembly mechanism disposed at either end of said valve housing comprising:
   an end plate with fastening means to removably fasten said end plate to a cap having a chamber within, said end plate having a bore within adapted to slidably accept the end of said removable and interchangeable valve cartridge assembly and communicating therewith and communicating with the bore of said valve housing, and a plurality of ports of any desired configuration extending axially from said end plate and communicating with said cap chamber and an adapter disposed within said cap chamber,
   said adapter disposed axially from and biased against said end plate and within said cap chamber having a bore communicating at one end with the bore of said end plate and to slidably accept the end of said removable and interchangeable valve cartridge assembly and communicate therewith and a bore at the opposite end adapted to accept a connecting means from a removable and interchangeable activating means and communicating therewith,
   said cap with fastening and sealing means to removably fasten said cap at one end to the said end plate and comprising said cap chamber disposed to accept said adapter, said connecting means, and biasing means to bias said adapter against said end plate within said cap chamber; a bore at the opposite end of said cap with sealing means adapted to slidably accept said connecting means and cooperating with said connecting means and said activating means, and a fastening means disposed at said end of the cap to removably fasten said cap to said activating means;
   said removable and interchangeable activating means disposed at the end of said removable and interchangeable cap assembly mechanism and cooperating therewith to activate said removable and interchangeable valve cartridge assembly of any version; and
   said removable and interchangeable valve cartridge assembly of any version disposed within said valve housing.

6. The fluid control valve of claim 5 wherein the removable and interchangeable valve cartridge assembly is of the lap spool version.

7. The fluid control valve of claim 5 wherein the removable and interchangeable valve cartridge assembly is of the packed spool version.

8. The fluid control valve of claim 5 wherein the removable and interchangeable valve cartridge assembly is of the proportional flow version.

* * * * *